(12) United States Patent
Amundsen (10) Patent No.: US 11,596,503 B2
(45) Date of Patent: Mar. 7, 2023

(54) APPARATUS FOR ALIGNING OR POSITIONING TEETH, AND RELATED METHODS

(71) Applicant: Ole Christian Amundsen, Stavanger (NO)

(72) Inventor: Ole Christian Amundsen, Stavanger (NO)

(73) Assignee: Ole Christian Amundsen, Stavanger (NO)

( * ) Notice: Subject to any disclaimer, the term of this patent is extended or adjusted under 35 U.S.C. 154(b) by 39 days.

(21) Appl. No.: 16/959,759

(22) PCT Filed: Jan. 10, 2019

(86) PCT No.: PCT/NO2019/050001
§ 371 (c)(1),
(2) Date: Jul. 2, 2020

(87) PCT Pub. No.: WO2019/139487
PCT Pub. Date: Jul. 18, 2019

(65) Prior Publication Data
US 2020/0375700 A1    Dec. 3, 2020

(30) Foreign Application Priority Data
Jan. 12, 2018    (NO) .................................. 20180057

(51) Int. Cl.
*A61C 7/22*    (2006.01)
*A61C 7/14*    (2006.01)
*A61C 7/28*    (2006.01)

(52) U.S. Cl.
CPC ................ *A61C 7/22* (2013.01); *A61C 7/146* (2013.01); *A61C 7/287* (2013.01)

(58) Field of Classification Search
CPC ........... A61C 7/22; A61C 7/146; A61C 7/287; A61C 7/10; A61C 7/20
See application file for complete search history.

(56) References Cited

U.S. PATENT DOCUMENTS 2,150,005 A    3/1939  McNinch
3,879,850 A    4/1975  Wallshein
(Continued)

FOREIGN PATENT DOCUMENTS

CH    675676    10/1990
CN    2039560    6/1989
(Continued)

OTHER PUBLICATIONS

Norwegian Search Report for 20180057, dated Aug. 10, 2018.
International Search Report and the Written Opinion for PCT/NO2019/050001, dated Mar. 22, 2019.

*Primary Examiner* — Amy R Sipp
*Assistant Examiner* — Sydney J Pulvidente
(74) *Attorney, Agent, or Firm* — Andrus Intellectual Property Law, LLP (57) ABSTRACT

An apparatus and a related pair of elements and methods are for aligning or positioning teeth. The apparatus is configured to be worn in a mouth of a wearer and further configured to be supported on the teeth of the wearer, and has elements arranged to be distributed along a set of the teeth and at least one engager member for engaging the elements for moving one or more of the teeth. In such embodiments, at least one pair of the elements can be engaged such that when in use, at least one part of one of the elements in the pair bears against at least one part of the other of the elements in the pair.

27 Claims, 6 Drawing Sheets

(56) References Cited

U.S. PATENT DOCUMENTS

| | | | |
|---|---|---|---|
| 3,984,915 A | 10/1976 | Noble et al. | |
| 4,202,328 A | 5/1980 | Sukkarie | |
| 4,243,386 A | 1/1981 | Kawaguchi | |
| 4,311,463 A | 1/1982 | Glattly | |
| 4,315,739 A | 2/1982 | Cain | |
| 4,384,854 A | 5/1983 | Garfinkel | |
| 4,504,229 A | 3/1985 | Garito et al. | |
| 4,508,505 A | 4/1985 | Smiley et al. | |
| 4,609,350 A | 9/1986 | Krause | |
| 4,875,856 A | 10/1989 | Grussmark | |
| 4,968,248 A | 11/1990 | McColgan et al. | |
| 5,791,896 A | 8/1998 | Ipenburg | |
| 6,071,121 A | 6/2000 | Simon | |
| 6,257,884 B1 | 7/2001 | Chang | |
| 8,337,198 B2 * | 12/2012 | Cosse | A61C 7/14 433/8 |
| 2003/0124478 A1 | 7/2003 | Amundsen | |
| 2006/0099545 A1 * | 5/2006 | Lai | A61C 7/08 433/6 |
| 2009/0098500 A1 | 4/2009 | Rendon | |
| 2012/0208144 A1 | 8/2012 | Chiaramonte | |
| 2014/0255865 A1 | 9/2014 | Gautam | |
| 2016/0199216 A1 | 7/2016 | Cam et al. | |

FOREIGN PATENT DOCUMENTS

| | | | |
|---|---|---|---|
| CN | 204562426 | 8/2015 | |
| DE | 2753640 | 6/1978 | |
| EP | 1702582 | 9/2006 | |
| GB | 2236953 | 4/1991 | |
| JP | S5530860 | 8/1980 | |
| JP | 2012065897 | 4/2012 | |
| WO | 0182821 | 11/2001 | |
| WO | 2008013365 | 1/2008 | |
| WO | WO-2008013365 A1 * | 1/2008 | A61C 7/14 |

* cited by examiner

APPARATUS FOR ALIGNING OR POSITIONING TEETH, AND RELATED METHODS

CROSS-REFERENCE TO RELATED APPLICATIONS

This application is the U.S. national stage application of International Application PCT/NO2019/050001, filed Jan. 10, 2019, which international application was published on Jul. 18, 2019, as International Publication WO 2019/139487 in the English language. The International Application claims priority of Norwegian Patent Application No. 20180057, filed Jan. 12, 2018. The international application and Norwegian application are both incorporated herein by reference, in entirety.

TECHNICAL FIELD

The present invention relates to positioning teeth, and, in particular, relates to an apparatus for aligning and/or positioning teeth, such as in orthodontics, and related methods.

BACKGROUND

For a range of reasons, teeth can acquire a non-ideal configuration in a person's mouth. This can be problematic for medical and/or dental health, and there may therefore be a need for medical treatment e.g. to preserve longevity or prevent loss of teeth in a patient, e.g. into old age. In addition, teeth have long been recognized as being linked to the external appearance and recognition or perception of a human face, particularly when smiling. Misaligned teeth relative to a reference external appearance condition (e.g. a social "ideal") can therefore also be experienced to be problematic for a person, e.g. for the psychological or general wellbeing of that person. There can therefore be a need for correction of teeth misalignment in patients for many purposes ranging from medical to cosmetic.

Various devices have been developed for reducing or aligning misaligned sets of teeth. In orthodontic dentistry, known arrangements for orthodontic tooth positioning can be generally divided into removable orthodontic apparatus and permanent orthodontic apparatus.

Removable orthodontic variants may include plates which are most often plastics based and which are often combined with steel bows and steel brackets which either function as fastening arrangements or as components for active positioning of teeth. For purposes of active positioning, the steel element is typically configured such that through the resilience of the metal, one may apply a force to a tooth or group of teeth which will result in a certain displacement of the tooth or teeth away from an original position. Alternatively, such plates may consist of plastics only where the resilient nature of the plastics can be utilized to apply a force to a tooth or group of teeth which results in a smaller displacement of the tooth away from the original position. A series of plastics rails can be manufactured, and these can function to move the teeth gradually little by little from the original position to a desired end position for the treatment.

In all types of plates and rails, the amount of displacement that can be generated is typically limited. The amount of control over the displacement obtained is also limited. This can lead to a need for frequent reactivation of the apparatus through adjustment of steel components or through manufacturing several new plastics rails. In addition, the possibilities for controlling the produced displacement of the tooth or teeth can be limited.

An advantage of removable orthodontic apparatus is that the patient has the option of taking the apparatus out in situations where it may be desirable to not have the apparatus in place. This may for instance be in social or job-related settings or when cleaning teeth and support tissue such as gums.

A permanent orthodontic apparatus differs from removable apparatus in that it is fastened to a patient's teeth in such a way that the patient cannot readily take the apparatus off by him or herself, and needs professional assistance to do so. Permanent apparatus may also be referred to as "fixed apparatus" in the art, but herein, the term "permanent apparatus" is applied to distinguish from removable apparatus where the removable apparatus is fixed to the teeth in operational use to apply the treatment but can be readily taken off and put back in place by hand by the patient him/herself when desired, without requiring specialist input or equipment.

An advantage of a permanently mounted orthodontic apparatus in comparison to removable apparatus can be a greater degree of control of the force vectors which act upon the teeth and support tissue. This can provide better control of the produced displacement of the teeth in all planes. By using the permanent apparatus, a tooth with root and support tissue can be subject to positioning in all relevant planes of movement, which in contrast is of limited possibility in removable apparatus.

The drawbacks of a permanent apparatus are that it can make access more difficult for cleaning teeth and supporting tissue, and also the fact that the apparatus protrudes from the tooth surface which can be experienced as intrusive toward cheeks, lips, and tongue of the patient, dependent upon whether the apparatus is fastened to the front or rear of the teeth. In the case of apparatus mounted on the rear of the teeth it may also affect a person's pronunciation of certain sounds. As is common to most permanent apparatus, there can often be a need to replace constituent parts of the apparatus and also there can be a need for adjustment and activation of the apparatus. In most cases, this must be performed by a skilled dentist to obtain the desired type and degree of movement of the teeth.

Typical intervals between check-up, reactivation, and adjustment of the apparatus at a dentist is normally in the region of 4 to 8 weeks. In this period, there can be generally an exponential decrease in the effects of the applied force from the apparatus against the tooth and of the degree of movement that has taken place.

There are many variants of permanent apparatus. Common to many of these, simple block elements are glued to the patient's teeth. The block elements have a groove of fixed dimension with space for fitting different types of metal bows which bind the elements together. By varying the dimension of the bow and its cross section (e.g. circular, quadratic, or rectangular), it may be possible to adapt and control the movement to which the teeth will experience. Other components for fixation of the bows to the block elements may include permanently mounted clips and "doors" which can retain the bows in the groove or small steel threads or elastic bands which can keep the bow in the groove on the block elements.

Treatment using a permanent orthodontic apparatus of this kind requires typically close follow up from a dentist and the achievement of the result will typically be dependent upon the experience and technical knowledge and experience of the dentist concerned.

SUMMARY OF THE INVENTION

According to a first aspect of the invention there is provided apparatus for aligning and/or positioning teeth, the apparatus configured to be worn in a mouth of a wearer and further configured to be supported on the teeth of the wearer, the apparatus comprising:

a plurality of elements arranged to be distributed along a set of the teeth; and at least one engager member, e.g. flexible elongate member, for engaging the elements for moving one or more of the teeth;

wherein at least one pair of the elements in the plurality is arranged to be engaged such that at least one part of one of the elements in the pair is arranged to bear against at least one part of the other of the elements in the pair.

The pair of elements may in this way cooperate to facilitate the alignment of the teeth during their movement upon engaging the elements.

Either or both of said parts of the elements in the pair may comprise at least one surface. The elements in the pair may be in contact or may be brought into contact with one another through the movement of the teeth upon engaging the elements. Thus, the surface of the one element may be arranged to contact the surface of the other element. The part, e.g. surface, of the one element may be arranged to slidably contact the part, e.g. surface, of the other element. The surface of the one element in the pair may be arranged to complement the surface of the other element in the pair.

The part of the one element in the pair may comprise a socket or hollow portion for receiving the part of the other element of the pair in the socket or hollow portion, e.g. in a male-female relationship. The part of the other element may comprise a fitting for fitting into the socket or hollow portion. The socket or hollow portion may have at least one surface for guiding the part of the other element into the socket or hollow portion.

The flexible elongate member may connect the elements together in series and be configured to be tensioned to apply a component of force to the elements to engage the elements for moving the one or more of the teeth. The flexible elongate member may comprise at least one flexible thread. The elements may comprise blocks. The engager member, e.g. the flexible elongate member, may comprise at least one flexible thread which may connect the blocks together in series along the thread. The flexible thread may be configured to be tensioned to apply a component of force to the blocks to engage the blocks for moving the one or more of the teeth.

The parts of the elements in the pair may be movable toward or away from one another. The parts of the elements in the pair may be movable in contact with one another, one relative to the other. The parts may be movable toward or away from one another with a component of movement along a length of the plurality of elements. The parts may be movable into a configuration in which further movement between the parts of the elements along a length of the plurality of elements may be prevented. The elements of the pair may lock together, e.g. by "clicking" or snapping into place. The locking together may facilitate obtaining a sufficiently stiff structure of the apparatus for transmitting mechanical forces to the teeth, and may e.g. reduce freedom of movement between elements for facilitating the alignment of teeth.

The parts may be movable relative to one another with a component of movement along a length of the plurality of elements for urging the one element outwardly or inwardly relative to the other element in response to the movement of the parts.

Either or both of said parts of the elements in the pair may comprise at least one surface that is at least partially curved. The curved surface may have an arc, and the surface of the one element may be in contact with the surface of the other element in the pair and may be movable one relative to the other along the arc.

Typically, some of the plurality of elements may be fixed elements configured to be fixed or attachable individually to different teeth. At least one other of the plurality of elements may be a floating element that can move with respect to one or more of said fixed elements. The one element of the pair may be one of the fixed elements or may be a floating element that can move with respect to one or more of said fixed elements. The other element of the pair may be another one of the fixed elements or may be another floating element that can move with respect to one or more of said fixed elements.

In certain embodiments, the plurality of elements may comprise two fixed elements configured to be fixed individually to different teeth, and one or more intermediate elements positioned between the two fixed elements.

The floating element(s) may be an intermediate element(s) positioned between two fixed elements. The two fixed elements may be configured to be fixed respectively to adjacent teeth in the set of teeth. The one element of the pair may be one of the two fixed elements and the other element of the pair may be the intermediate element.

The pair of elements may be a first pair, and the apparatus may further comprise a second pair of elements wherein a part of one element of the second pair may be arranged to bear against a part of another element of the second pair, wherein the one element of the first pair may be one of the fixed elements and the other element of the first pair may be a floating element, and the one element of the second pair may be the floating element and the other element of the second pair may be another one of the fixed elements.

The engager member may be configured to be operable to impart a component of force on the elements for engaging the elements.

The engager member may be configured to be tensioned between elements to impart a component of force on the elements for engaging the elements.

The engager member may be configured to connect some or all the plurality of elements together. The engager member may comprise at least one flexible elongate member configured to extend along the set of teeth. The flexible elongate member may be slidably received in a passageway through all or some of the elements to be engaged.

The flexible elongate member may comprise at least one thread, e.g. a flexible engaging thread. The thread may be configured to be relaxed to conform to variations in projection of the teeth in malocclusion and may be tensioned to engage the elements for imparting at least one force for aligning the teeth.

The flexible elongate member may comprise any one or more of: metal, synthetic material, and plastics material. The flexible elongate member may comprise cord, lacing, ribbon or the like. The flexible elongate member may be non-resiliently flexible.

The apparatus may be further configured to be attached to the teeth so as to be releasably attachable and detachable by the wearer.

The apparatus may further comprise fastening means for attaching the apparatus to the set of teeth. The fastening means may comprise fasteners. The fastener may be configured to grip onto one or more individual teeth when pushed onto the teeth by a user, e.g. the wearer. The fastener may comprise a "grip" device. The fastener may be adapted to individual characteristics of a tooth of the wearer. The fastener may be applied by the wearer for fixed attachment to a tooth of the wearer.

Any one or more of the elements may comprise a block or blocks respectively.

The apparatus may be an orthodontic treatment apparatus. The treatment may be for cosmetic or dental health purposes.

The plurality of elements may comprise a series of elements wherein the parts of the pair or pairs of elements may be mutually adapted to one another, and may make up a continuous row of mutually adapted elements. The row may extend along the set of teeth.

The surfaces between which contact may be obtained may be three-dimensionally complementary and may cooperate when they are in active contact with each other.

Some or all of the elements, e.g. the elements of the pair, may be coupled or held together by one or more flexible elongate members. The flexible elongate member(s), e.g. thread(s), may define a degree of cooperation of the elements through defining a degree of contact between the parts, e.g. surfaces, of the pair of elements, e.g. a relative position or amount overlap of one surface relative to the other. The elongate flexible member may be resilient, elastic, rigid (non-elastic), or any combination thereof.

The elements may be cooperable by contact between the parts of the elements in the pair. The degree of cooperation may be determined at least partly by the flexible elongate member, e.g. threads. The elements may be moved or driven toward or away from one another, and may be coupled or held together by one of more throughgoing flexible elongate members, which may preferably be integrated into the apparatus as a unitary structure. The apparatus may comprise a unitary structure which can be inserted and mounted in the mouth of the wearer as a single entity, e.g. applied by hand of the wearer.

The flexible elongate member may be configured to define a degree of contact between the parts in the pair of elements. The parts may comprise complementary three-dimensional contact surfaces. The elements and/or the parts in the pair of elements can be reversibly moved away and moved together again to an original or previous relationship between the elements and/or parts. The flexible elongate member may cooperate with the elements or parts, e.g. three-dimensional complementary surfaces, of the pair or pairs of elements and thereby may mutually support and optionally lock the elements to each other. The locking may thus prevent further relative movement between elements longitudinally along the set of teeth, rotationally about the longitudinal axis of the apparatus along the set of teeth, and/or laterally with respect to the longitudinal axis.

The apparatus may be shaped and/or adapted to a desired tooth configuration after completion of the tooth alignment process. The apparatus may be further shaped and/or adapted to a planned tooth configuration or position of individual teeth during a process of alignment between an initial tooth configuration and a desired tooth configuration.

"Releasable/removable" apparatus as used herein indicates that the patient/wearer can put the apparatus on and take it off themselves. "Permanent" apparatus as used herein indicates that the patient/wearer cannot put the apparatus on or take it off without professional help. The apparatus may be configured to be a removable apparatus. Alternatively, the apparatus may be configured to be a permanent apparatus.

The parts of the pair or pairs of elements, e.g. the three-dimensional complementary contact surfaces, may together with the throughgoing or longitudinally extending elongate flexible member, allow the teeth and/or supporting tissue obtain exact positions and relations. The parts, e.g. contact surfaces, may cooperate in dependence upon the operation of the elongate flexible member which may be tightened and slackened as required. The apparatus may include an activator for activating the engager or elongate flexible member to be tightened or slackened as required. By tightening, elements in the plurality may be moved toward one another so that the parts of the at least one pair of elements, e.g. the complementary contact surfaces thereof, may advance into contact or into greater degree of contact with one another. Upon further activation, full contact between the surfaces may be obtained. In full contact, the elements may be supported and/or locked to one another. A precise force may in this way be transferred to the teeth and supporting tissue, the teeth may obtain new positions and relations through remodelling or adaptation of the root membrane, attachment apparatus, and/or surrounding bone structure. A change in position of the teeth may in this way be defined by the way in which the parts of the elements may bear against each other, e.g. the three-dimensional contact surfaces, and may be shaped.

A transfer of force to the teeth and support tissue may be obtained through activation of a longitudinally extending and/or throughgoing elastic, rigid, and/or resilient elongate flexible member. By engaging the engager or activating the flexible elongate member, the apparatus may operate to obtain a planned desired configuration of elements with full degree of contact between the parts of the elements in the pair or pairs of elements. A force that may be transferred from the elongate flexible member to the elements and their parts, e.g. contacting surfaces, may be transmitted to the teeth and support tissue. Contact between the parts of the elements in the pair, may therefore define the final positions of the teeth after the movement/adjustment of teeth has ended. The fixed, elastic, and/or resilient elongate flexible member which may couple the blocks together may be arranged to allow contact to be re-established, or is sought to be achieved between the parts of the one or more pairs of elements in the apparatus, at all times after slackening and subsequent activation of the engager or activation of the flexible elongate member. Thus, the wearer in practice may deactivate the elements to remove the apparatus if desired. Later on, the wearer may reattach the apparatus to the teeth, and may reactivate the elements. By reactivation of the elements, the parts of the pair or pairs of elements may cooperate to reobtain a previous relationship between parts and progress toward an end desired configuration to align the teeth.

According to a second aspect of the invention, there is provided a pair of elements for use in the apparatus of the first aspect, wherein the pair of elements comprises:

a first element and a second element; wherein at least one part of first element is arranged to bear against at least one part of the second element when engaged during operational use of the apparatus.

According to a third aspect of the invention, there is provided a method of aligning and/or positioning teeth, the method comprising the steps of:

attaching the apparatus of the first aspect to a set of teeth of a wearer, whereby the apparatus is disposed within the mouth of the wearer and the plurality of elements are distributed along the set of teeth; and engaging at least one pair of the elements such that at least one part of one of the elements in the pair bears against at least one part of the other of the elements in the pair.

The method may further comprise activating an engager member to engage the elements. The method may be a cosmetic method or a medical treatment method. The method may further comprise assessing a need for alignment of the teeth for medical or therapeutic treatment purposes; and performing the method to align the teeth if the need for medical or therapeutic treatment purposes is negative.

According to a fourth aspect of the invention, there is provided a method of preparing the apparatus of the first aspect for use, the method comprising:

providing a model of a set of teeth of a patient in a desired target configuration;

configuring at least one part of the apparatus based on the model; and distributing the plurality of elements along the set of teeth, attaching the apparatus to the set of teeth of the patient.

Any of the aspects may have further features as defined in relation to any other aspect, wherever described herein.

Embodiments of the invention can be advantageous in various ways, as will be apparent from reading of the specification throughout. In general, the apparatus may be operable to move individual teeth or groups of teeth from a given position to another. This apparatus may change an appearance of the teeth of the wearer and may produce an alignment of teeth in an arrangement where the teeth may be arranged for better dental health.

BRIEF DESCRIPTION OF THE DRAWINGS

There will now be described, by way of example only, embodiments of the invention with reference to the accompanying drawings, in which.

SPECIFIC DESCRIPTION OF EMBODIMENTS

Figure 1:
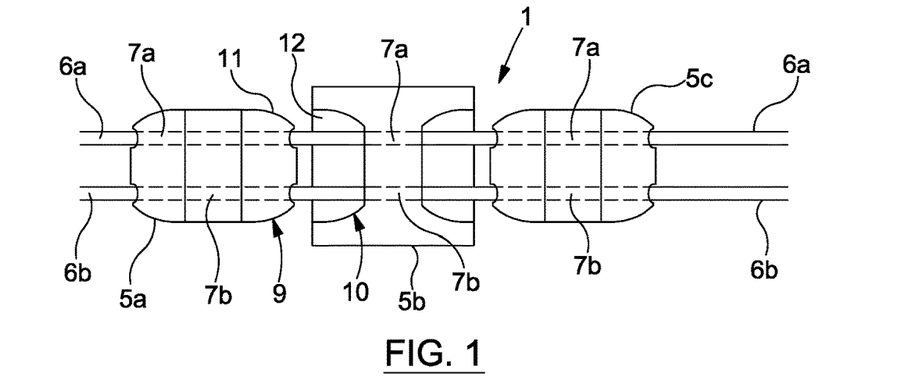
FIG. 1 is a schematic representation of apparatus according to an embodiment of the invention.

With reference first to FIG. 1, an apparatus 1 for aligning and/or positioning teeth is generally depicted. The apparatus 1 has a plurality of elements in the form of a plurality of discrete blocks 5a-5c arranged in series. The set of blocks 5a-5c is configured to be mounted as a unit to part of an upper or lower arch of a set of teeth. When the blocks 5a-5c are fitted to the target teeth of the arch, the blocks 5a-5c are arranged distributed along the set of teeth.

The apparatus 1 includes engager members in the form of flexible engaging threads 6a, 6b ("flexible elongate members"). The blocks 5a-5c (i.e. "elements") are connected to one another by the throughgoing engaging threads 6a, 6b. The engaging threads 6a, 6b pass from one block to the next through internal channels 7a, 7b in the blocks. The blocks 5a-5c are movable relative to one another, toward or away from one another, along the engaging threads 6a, 6b.

Consider the pair of blocks 5a and 5b of the plurality. A part of the block 5a is arranged to bear against a part of the adjacent block 5b when the blocks in the pair are engaged and are moved upon activation of the apparatus in use. In FIG. 1, the blocks 5a-5c are arranged apart from one another, such as typically is an initial configuration of the apparatus before it is activated.

More specifically, the block 5b has a hollow receiving part 12 into which a penetrating part 11 of the block 5a is arranged to fit in a male-female relationship when the blocks 5a, 5b are brought together. The block 5a has a contact surface 9 and the block 5b has a contact surface 10. The surfaces 9, 10 are shaped to complement one another. The contact surfaces 9, 10 are in contact during the movement together of the blocks 5a, 5b toward a configuration in which they are engaged in the male-female relationship. The activation and use of such apparatus 1 will be described further below.

The surfaces 9, 10 in FIG. 1 are curved in three dimensions. Typically, the surface 9 of the penetrating part 11 has generally a bulbous shape such as that of a dome while the surface 10 of the receiving part 12 has generally a concave shape such as that of a bowl. The surfaces 9, 10 are co-operable to obtain a position of the block 5a relative to the block 5b based on the angle between the surfaces 9, 10 and degree to which they are engaged, e.g. how far the penetrating part 11 overlaps or has entered the receiving part 12. The receiving part 12 defines in effect a path where the surface 10 helps to guide the penetrating end 11 toward an end position in full engagement between the elements 5a, 5b.

The blocks 5a and 5c are configured to be fixedly attached to the respective adjacent teeth. However, the block 5b is an intermediate "floating" block which is movable relative to the fixed blocks 5a, 5c and movable relative to the teeth upon use. Upon being engaged, the blocks 5a and 5c are subjected to a force via the engaging threads 6a, 6b. The force is transmitted to the teeth to which the blocks 5a, 5c are fixed and the teeth are thereby caused to move toward alignment. After sufficient movement of one relative to the other, the block 5a engages the block 5b via the contact surfaces 9, 10 as described above. The surfaces 9, 10 contact one another and are shaped to constrain or guide the relative movement between blocks 5a-5c so as to correct the position of the teeth appropriately.

It can be appreciated that the blocks 5a, 5c that are to be fixedly attached to the teeth may be fixed in various ways, for example to provide a permanent apparatus or a removable apparatus. The blocks may be applied by suitable fastening means. For example, it is possible to "glue" the blocks 5a, 5c to a front or rear surface of the teeth by means of an adhesive or cement for a permanent attachment, or the blocks 5a, 5c could be applied fixedly in place on the teeth by fasteners such as attachment caps which are fitted to and removed from the teeth simply by hand force for providing a removable attachment of the apparatus.

Figures 2A, 2B, 3:
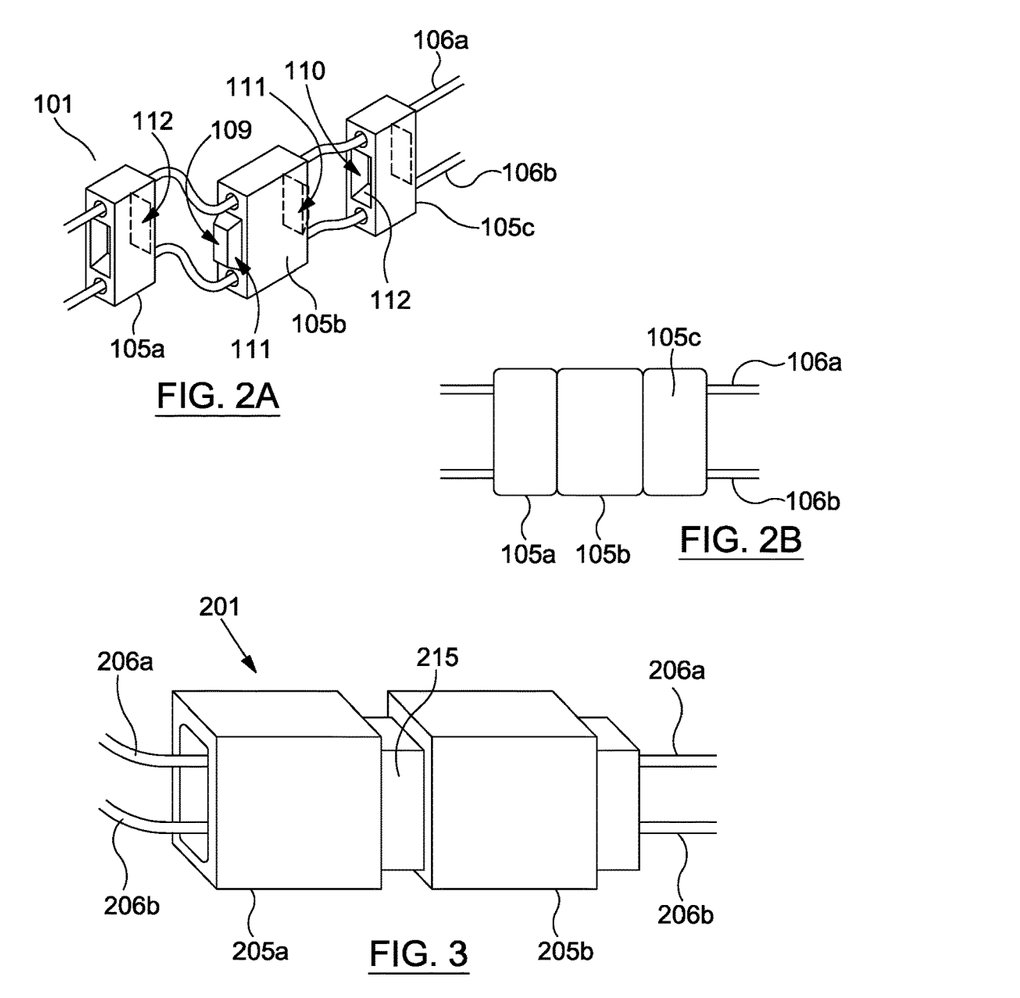
FIGS. 2A and 2B are representations of apparatus in two different configurations according to another embodiment of the invention, wherein in FIG. 2A, the apparatus is inactive, and elements are not engaged, and in FIG. 2B, the apparatus is active to engage the elements.
FIG. 3 is a schematic representation of elements of an apparatus according to an embodiment of an invention.

FIGS. 2A and 2B depict generally apparatus 101 for aligning teeth where a plurality of blocks 105a-105c are arranged in series and are connected together via engaging threads 106a, 106b. The apparatus 101 operates similarly to that of apparatus 1. In FIGS. 2A and 2B however, the apparatus 101 and blocks 105a-105c are shaped differently to those of FIG. 1. In particular, the block 105b has penetrating parts 111 each having an angled surface 109 to bear against a complementary angled surface 110 on the receiving parts 112 of adjacent blocks 105a, 105b. All or some of the blocks 105a-105c may be fixedly attached to respective teeth of a patient in use. In FIG. 2B, the configuration of the apparatus 101 in full engagement is indicated. FIG. 2A is an initial configuration before the blocks 105a-c have moved relative to one another along the engaging threads 106a, 106b.

FIG. 3 provides an example of apparatus 201 for aligning teeth having two floating blocks 205a, 205b intended to form part of the series of blocks. The floating blocks 205a, 205b are to be arranged in a series of blocks along the arch, in an intermediate position between other blocks (not shown) that are fixedly attached to the teeth by appropriate fastening means. These intermediate floating blocks 205a, 205b include surfaces 215 where one bears against the other during relative movement therebetween during activation of the apparatus 201 and engagement of the blocks. FIG. 3 indicates the configuration after full engagement of the block 205a, with respect to the block 205a. Flexible engaging threads 206a, 206b are also indicated in FIG. 3.

The manner in which the apparatus of the above examples is used will now be described in further detail.

Figure 4A:
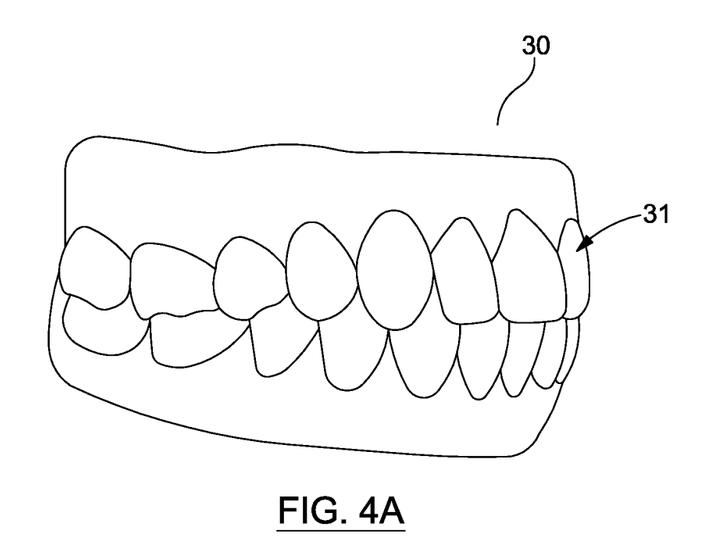
FIGS. 4A are 4B are representations exemplifying a set up model of teeth of a patient with teeth in ideal position, FIG. 4A being a perspective view of both upper and lower arches of teeth, and FIG. 4B being an underside view of the upper arch.
Figure 4B:
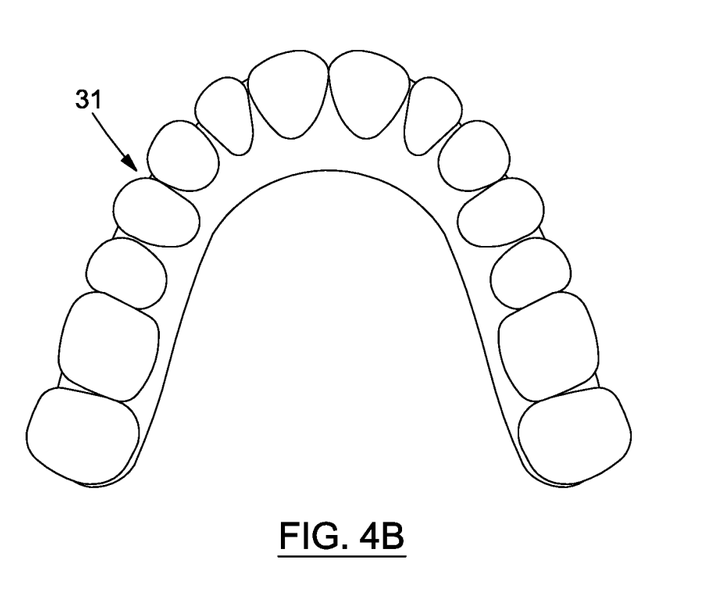

We turn first to consider FIGS. 4A and 4B and FIGS. 5A and 5B. The process for preparing an apparatus 301 for use by a patient begins first by using a model of the teeth 30, in a so-called "set-up" configuration. The set-up model may for example be a physical model or a digital model on a computer. In FIGS. 4A and 4B, the set-up model 30 of a patient's teeth is shown, showing the teeth aligned in the future ideal, corrected position. The upper arch 31 of teeth of the model 30 is seen in FIG. 4B.

Figure 5A:
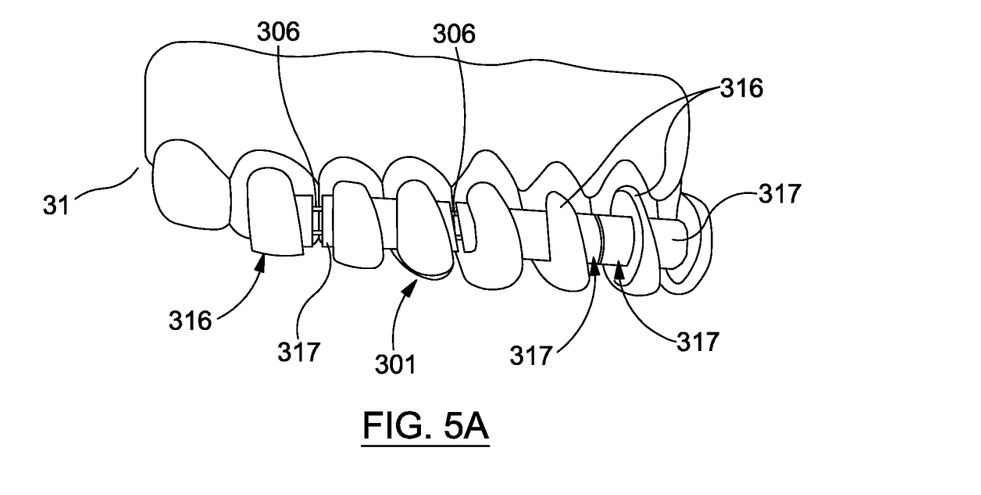
FIGS. 5A and 5B are representations of an apparatus according to an embodiment of the invention fitted to the model teeth of FIGS. 4A and 4B, in a perspective view and an underside view of the upper arch respectively.
Figure 5B:
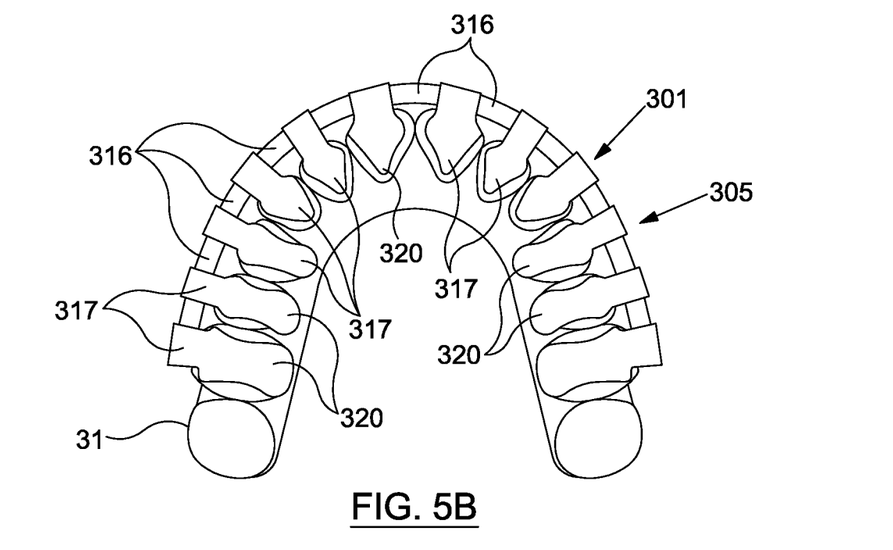

The apparatus 301 is applied to the model arch of teeth 31 as indicated in FIGS. 5A and 5B. On this basis, the apparatus 301 is adapted to the final configuration for the end of the treatment intended to be achieved for the set of teeth 31. This is typically therefore a fully tightened configuration of the apparatus 301, adapted to the teeth 31 in their desired end position. The series of elements 305 in the apparatus 301 include tooth supported fixed blocks 317 and intermediate floating blocks 316. The elements 305 are arranged to follow the final tooth arch shape and are individually adapted to obtain the desired final positions of the teeth after completed active treatment. The end position of the teeth 31 is defined through this set up of the teeth in the ideal position (setup) either digitally produced or manually produced. This model 30 defines the tooth arch and the position of the individual teeth in all planes. The apparatus 301 can be produced and adapted to the physical setup model or it may be produced based on data regarding the teeth from the digital setup model.

After the setup and obtaining the appropriately configured apparatus 301, the series of blocks 316, 317 are adapted and distributed in the apparatus according to the desired placement and in desired relation to the surface of the target teeth to be moved.

In order to attach the apparatus 301 to the patient's teeth in the proper position, e.g. based on the model data, the blocks 317 need to be attached in fixed position to the teeth. A suitable fastening means is used for correct attachment and positioning of the blocks 317 on the teeth. In this example, fastening means in the form of fasteners 320 are used which may be defined and/or adapted to the teeth in the setup model.

The fasteners 320 can be digitally or manually produced for the relevant teeth and the corresponding fixed blocks 317, and are appropriately integrated with the blocks 317 in unitary fashion such that the blocks 317 are adapted to the teeth and fit onto respective teeth in suitable position and/or orientation. The fasteners 320 can be provided as "grip" devices that grip onto individual teeth surfaces when pushed onto the tooth by a user. Alternatively, the fasteners 320 can be permanently attached, e.g. by adhesive. One or more intermediate blocks 316 providing contact surfaces which are complementary in shape are disposed in the spaces between the fixed blocks 317.

The number, size, and shape of the fixed blocks 317 may in general vary according to the anatomy and tooth arch shape, together with the position of the teeth and the bite discrepancy which is sought to be corrected.

Engaging threads 306 are fed through channels or tracks in the blocks 305, so as to pass through all of the blocks 305 in the orthodontic apparatus 301.

Figure 6A:
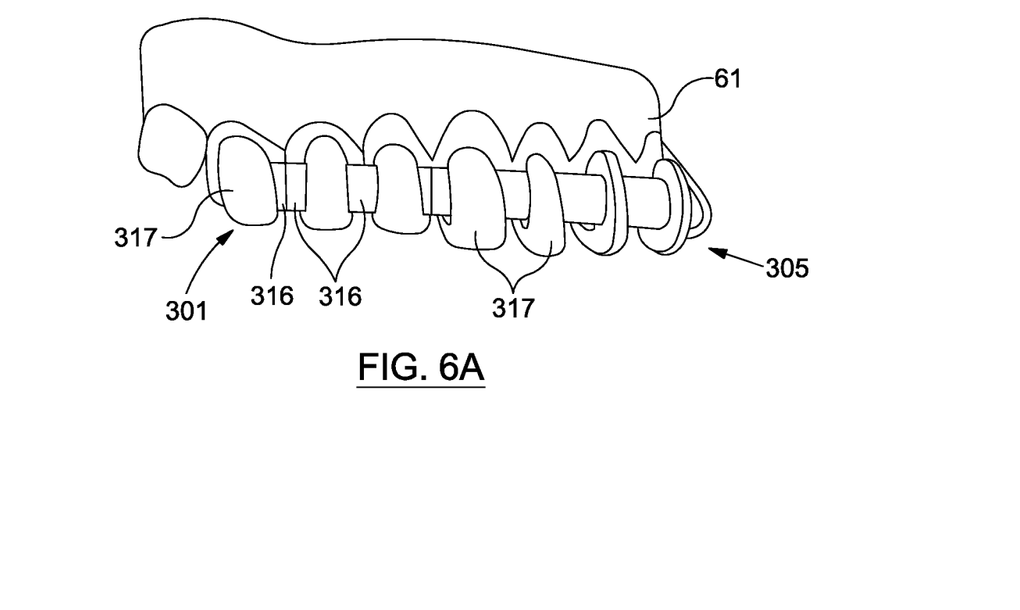
FIGS. 6A and 6B are representations of the apparatus of FIGS. 5A and 5B fitted to the upper arch of teeth of the patient where the patient's teeth in malocclusion to be corrected using the apparatus, in a perspective view and underside view of the upper arch respectively.
Figure 6B:
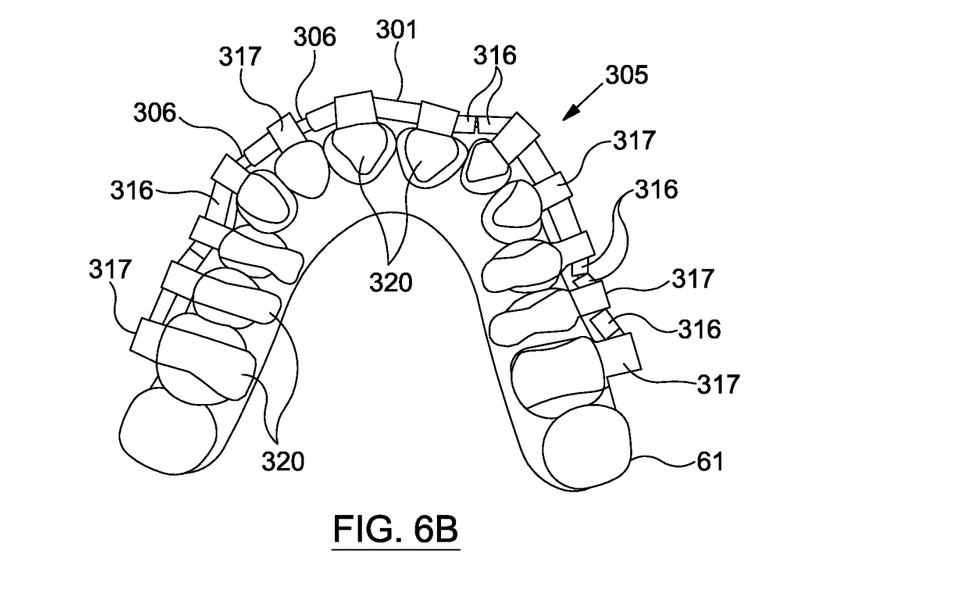

Referring now further to FIGS. 6A and 6B, the apparatus 301 which has been prepared in accordance with the setup model or models is then mounted to the teeth of the patient. The blocks 317 which are to be fixedly attached to the teeth are attached to the relevant teeth of the patient in the appropriate positions by application of the fasteners 320.

It can be appreciated that the individual teeth of the set up model are anatomically the same as those of the patient, except that in the set up model they are positioned and aligned in the final planned configuration for the treatment. A print or scan of the patient's teeth may be taken in order to reproduce the surface anatomy for the model. The fasteners 320 and blocks 317 can therefore be designed to fit the individual teeth of the patient in the model and are attached in the same positional relationship on an individual tooth when applied to the patient. The engaging threads 306 which connect between the blocks flex to allow for the difference in position and alignment of the patient's teeth in malocclusion compared with the model positions.

The apparatus 301 is then activated. The engaging thread or threads 306 are tensioned between fixed blocks 317. This generates a force which engages the fixed block 317, and the teeth to which they are fixed, to move relative to one another. The intermediate blocks 316 engage such that the surface of an intermediate block 316 bears against a complementary surface of an adjacent intermediate block 316 or fixed block 317, and the further movement of the teeth toward alignment takes place in dependence upon the contact established between the complementary surfaces. While throughout herein complementary surfaces in contact with one another are mentioned as an example, it can be readily appreciated that other arrangements can achieve a guiding effect upon the movement of the teeth by one element bearing against another during the movement of the elements relative to one another and/or progression toward the end of treatment conditions, once the apparatus is activated.

Activating the apparatus 301 to engage the elements is achieved through tensioning the engaging threads 306 ("engager members"). Various arrangements can be provided for doing so. For example, an arrangement for tightening and slackening the engaging thread or threads 306 can be established in or on one or more of the blocks 316, 317 in the apparatus. A mechanism, e.g. a rotatable spool or the like mounted to one of the elements, may be used for tightening or slackening the engaging threads or threads 306. By tightening the thread tension may be applied and a force may be transmitted to the elements to engage them.

The length of the engaging thread or threads 306 is determined by the linear distance through the channels on the blocks 316, 317 from end to end of the orthodontic apparatus when the blocks 316, 317 are transferred from the setup to the malocclusion model or patient. This distance is larger than the end-to-end linear distance through the channels of the blocks when applied to the setup model. By activation and/or tightening of the engaging threads 306, the blocks 316, 317 in the orthodontic apparatus are driven toward one another. Through the fastener arrangement, the teeth will follow from the relevant position in malocclusion to final ideal position dictated by and defined by the orthodontic apparatus according to the setup of the ideal position of the teeth.

Figure 7:
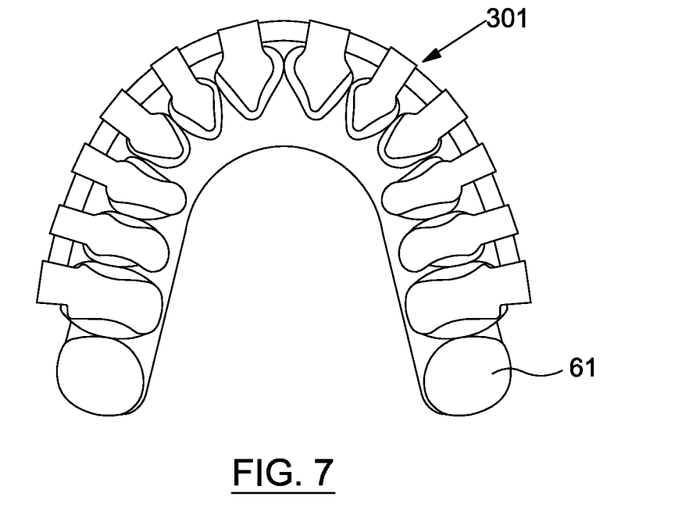
FIG. 7 is an underside view of the upper arch of teeth of the patient of FIGS. 6A and 6B with the apparatus attached at an end of the treatment.
Figure 8:
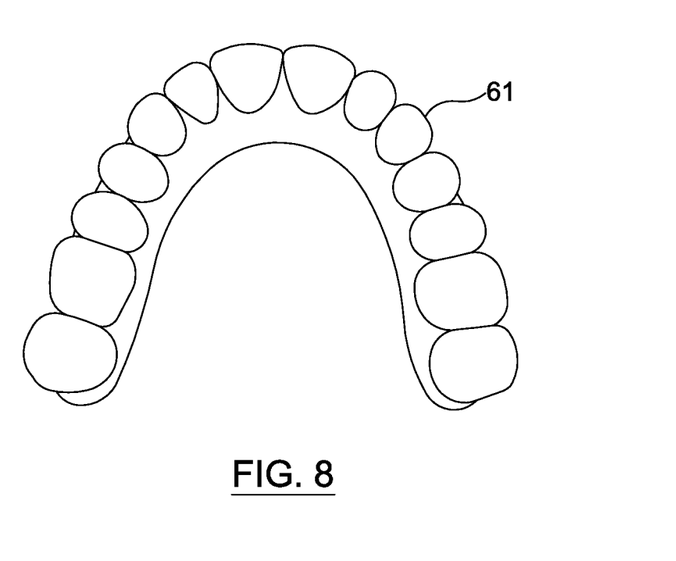
FIG. 8 is an underside view of the upper arch of teeth of the patient after correction and removal of the apparatus of FIG. 7.

In FIG. 7, the apparatus 301 at the end of treatment has aligned the patient's teeth 61 in the desired configuration as planned. The apparatus 301 is removed and, in FIG. 8, the teeth 61 can be seen without the apparatus in their final positions.

Figure 9:
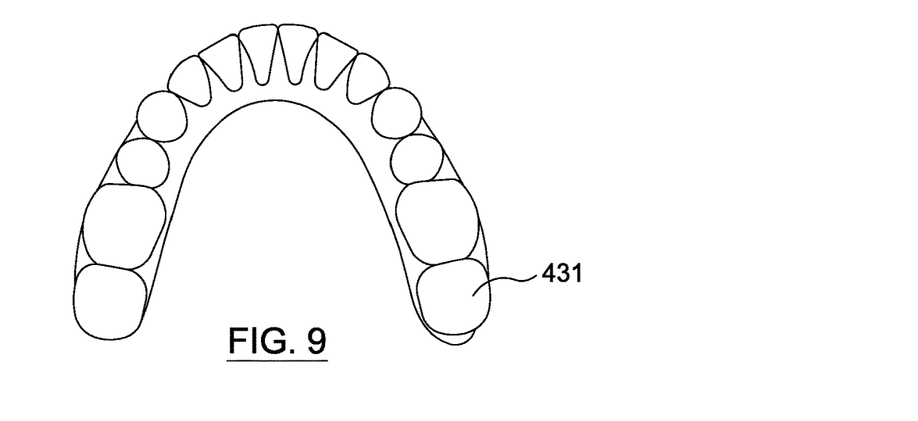
FIG. 9 is a topside view of the lower arch of the model teeth of FIGS. 5A and 5B.
Figure 10:
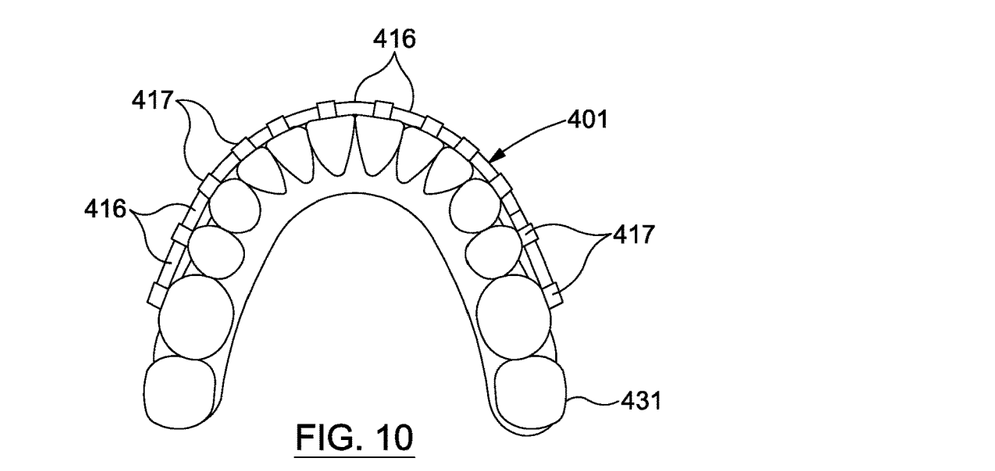
FIG. 10 is a topside view of an apparatus according to another embodiment of the invention fitted to the lower arch of the model teeth of FIG. 9.
Figure 11:
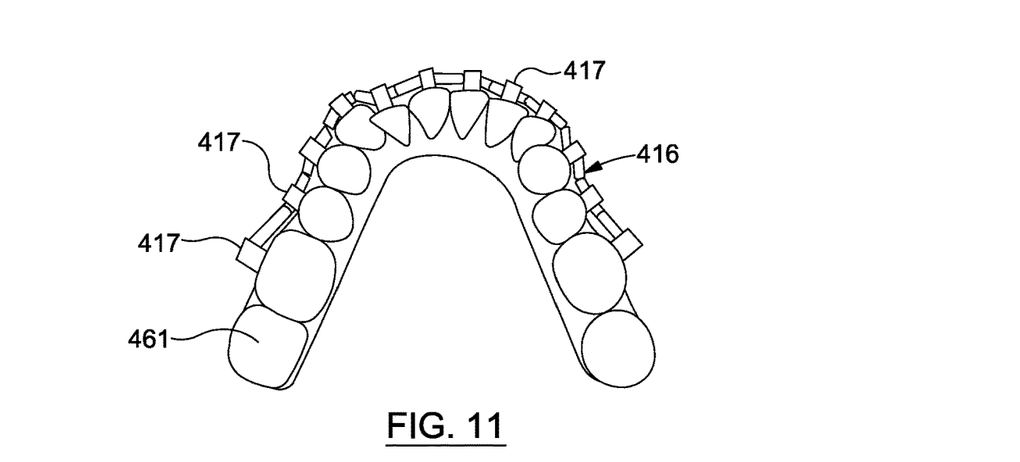
FIG. 11 is a topside view of the apparatus of FIG. 10 fitted to the lower arch of teeth of a patient where the patient's teeth are in malocclusion to be corrected by use of the apparatus.

Turning to FIGS. 9 to 11, another example apparatus 401 is depicted for aligning teeth. A setup model of the lower set of teeth 431 in the ideal planned positions after treatment is provided, as seen in FIG. 9. In FIG. 10, the apparatus 401 is adapted to the setup model teeth 431 and data obtained for properly positioning the teeth when transferred to the patient's teeth 461 in malocclusion. The apparatus is relaxed so that it can be fitted to the patient's teeth 461 in malocclusion. In FIG. 11, the apparatus 401 is fitted to the patient's teeth 461. The apparatus 401 is then tensioned. The blocks 416, 417 are engaged so as to progress the teeth toward the final treatment positions. Pairs of adjacent blocks bear against each other, where part of one block contacts part of an adjacent block to control the movement of the blocks and teeth relative to one another during the treatment period. Eventually, the apparatus 401 and teeth 461 is brought into substantially the same position as planned on the setup model teeth 431 in FIG. 10. The teeth 461 are then aligned, and the planned treatment using the apparatus 401 is complete.

While the above examples illustrate blocks 316, 317, 416, 417 applied along an outside of the teeth 61, 461, it will be appreciated that in other examples the apparatus 301, 401 could be applied in the corresponding manner to place blocks on the along an inside of the arch of the teeth 61, 461.

In the above, the apparatus can be provided as a unit. It can be provided throughout the process without need for adjusting or replacing the whole or part of the apparatus during the treatment process, since the apparatus can change dynamically during treatment. In this regard, the apparatus can be adapted to a predefined initial situation (set up) which represents the ideal position of the teeth that would be desirable to obtain through the treatment. The apparatus can flex and flexibly adapted to different orientations and degrees of inward or outward protrusion between teeth. Through stretching or slackening of the engaging threads the apparatus is adapted to the variations of a patient's teeth positions in the relevant malocclusion. When relaxed, the threads can readily flex and fully bend back on itself so that the apparatus can be fitted along a tortuous path if required in order to accommodate variations in teeth position or orientation. During the treatment process, the predefined initial configuration of the apparatus can be recreated by drawing the engaging threads together or tightening them. Through this activation of the engaging threads in the apparatus, the blocks can be driven toward and into contact with one another, whereby eventually the predefined initial configuration for the apparatus can be recreated. The apparatus by virtue of it being fastened to the patient's teeth will, as a result, guide the teeth from their original positions in malocclusion to the desired ideal positions defined for the treatment.

A further advantage of the orthodontic treatment apparatus can be that the apparatus is removable such that the patient themselves can put the apparatus on and take it off without assistance from a dentist. The patient can therefore be without the apparatus during certain periods of the day. The patient can also both tighten and slacken the apparatus through activation or slackening of the engaging thread or threads. The activation mechanism for engaging the apparatus can therefore be hand operated by the wearer.

The predefined treatment result to which the apparatus is adapted can reduce the need for follow up by a dentist for adjustment or activation. The movement produced during engagement of blocks can depend upon the nature of contact between the various pairs of blocks. The surfaces bearing against each other may thus facilitate to guide the blocks directly toward the desired location with full control of force vectors and the degree of force impressed upon individual teeth and supporting tissue.

The apparatus may also have an ability to capture any unforeseen wander of teeth that may undesirable either during and/or after the orthodontic treatment has ended. Teeth that have been moved in general have a tendency to wander back or wander in the direction back toward their original position both during and after orthodontic treatment. This can be a complicating factor for treatment of bite discrepancies.

In the prior art (removable and permanent), one will usually need to replace parts of the apparatus or produce a new apparatus to correct unintended tooth displacements or wander during the treatment. After treatment has ended, undesired changes in teeth position or wander can lead to a need to start a new process of treatment and produce new apparatus, either permanent or removable.

Using the present apparatus, such discrepancies in teeth position can be corrected without needing to produce a new apparatus or replace parts of the apparatus.

The treatment apparatus may be fastened to the target teeth by utilizing known techniques such as glue and/or a fastener such as a close-fitting sleeve, grip device, or cap or the like. The apparatus can in general be releasably removable or permanently fastened (not removably) to the target teeth.

It should also be noted although two engaging threads 306 are illustrated above, it can be appreciated that only one such thread could be applied in other embodiments. The threads 306 connect the blocks 305 together to provide a series of blocks 305 along the threads 306.

The threads 306 can be wound or folded about a tight angle or arc. For example, they can bend by 90 degrees, 180 degrees or more, e.g. without exhibiting permanent plastic deformation. The threads 306 may typically not exhibit resilience in response the conditions that they are subject to in application to the model or actual teeth in the apparatus described above. Thus, the threads 306 can readily flex and slacken to required configurations and conform to the surface profiles of the teeth in the applicable malocclusion. However, elastic threads may be employed in certain variants. A flexible elongate members may similarly be embodied in the form of string, ribbon, lacing, or cord, e.g. of natural or synthetic fibres.

Various modifications and improvements may be made without departing from the scope of the invention herein described.

The invention claimed is:

1. An apparatus for aligning or positioning teeth, the apparatus configured to be worn in a mouth of a wearer and further configured to be supported on the teeth of the wearer, the apparatus comprising:
   a plurality of elements configured to be arranged along a set of the teeth; and
   at least one engager member for engaging the elements for moving one or more of the teeth;
   wherein the plurality of elements has at least one pair of elements which are arranged to be engaged such that at least one part of one of the elements in the pair is arranged to bear against at least one part of the other of the elements in the pair; and
   wherein the part of the one element in the pair comprises a socket or hollow portion for receiving the part of the other element in the pair in a male-female relationship, wherein the socket or hollow portion has at least one surface for guiding the part of the other element in the pair into the socket.

2. The apparatus according to claim 1, wherein the engager member comprises at least one flexible thread which connects the elements together, the at least one flexible thread being configured to be tensioned to apply a component of force to the elements to engage the elements for moving the one or more of the teeth.

3. The apparatus according to claim 2, wherein one or more of the elements are movable in use along the at least one flexible thread.

4. The apparatus according to claim 1, wherein the parts are movable toward or away from one another with a component of movement along a length of the plurality of elements, and further movable into a configuration in which further movement between the parts of the elements along the length of the plurality of elements is prevented.

5. The apparatus according to claim 1, wherein some of the plurality of elements are fixed elements configured to be fixed to different teeth and at least one other of the plurality of elements is a floating element that can move with respect to one or more of said fixed elements.

6. The apparatus according to claim 5, wherein the one element of the pair is one of the fixed elements or is the floating element that can move with respect to one or more of said fixed elements.

7. The apparatus according to claim 6, wherein the other element of the pair is another one of the fixed elements or is another floating element that can move with respect to one or more of said fixed elements.

8. The apparatus according to claim 5, wherein the floating element is an intermediate element positioned between two fixed elements.

9. The apparatus according to claim 1, wherein some of the plurality of elements are fixed elements configured to be fixed to different teeth and at least one other of the plurality of elements is an intermediate element at least part of which is configured to be positioned between two of the fixed elements, and wherein the two fixed elements are configured to be fixed respectively to adjacent teeth in the set of teeth.

10. The apparatus according to claim 9, wherein the one element of the pair is one of the two fixed elements and the other element of the pair is the intermediate element.

11. The apparatus according to claim 9, wherein said pair of elements is a first pair, and the apparatus further comprises a second pair of elements wherein a part of one element of the second pair is arranged to bear against a part of another element of the second pair, wherein the one element of the first pair is one of the fixed elements and the other element of the first pair is one of the intermediate elements, and the one element of the second pair is another one of the intermediate elements and the other element of the second pair is another one of the fixed elements.

12. The apparatus according to claim 1, wherein the engager member is configured to be tensioned between the plurality of elements to impart a component of force on the plurality of elements for engaging the plurality of elements.

13. The apparatus according to claim 1, wherein the engager member comprises at least one flexible elongate member configured to extend along the set of teeth.

14. The apparatus according to claim 13, wherein the flexible elongate member is slidably received in a passageway through all or some of the plurality of elements to be engaged.

15. The apparatus according to claim 13, wherein the flexible elongate member comprises at least one flexible thread which is configured to be relaxed to conform to variations in projection of the teeth in malocclusion and tensioned to engage the elements for imparting at least one force for aligning the teeth.

16. The apparatus according to claim 1, further configured to be attached to the teeth so as to be releasably attachable and detachable by the wearer.

17. A pair of elements for use in the apparatus according to claim 1, wherein the pair of elements comprises:
   a first element and a second element, wherein at least one part of first element is arranged to bear against at least one part of the second element when engaged during operational use of the apparatus to facilitate aligning the teeth of the wearer.

18. A method of preparing the apparatus for use with the pair of elements of claim 17, the method comprising:
   providing a model of a set of teeth of a patient in a desired target configuration;
   configuring at least one part of the apparatus or pair of elements based on the model; and arranging the plurality of elements along the set of teeth, attaching the apparatus or the pair of elements to the set of teeth of the patient.

19. A method of aligning or positioning teeth, the method comprising the steps of:
attaching the apparatus of claim 1 to a set of teeth of the wearer, whereby the apparatus is disposed within the mouth of the wearer and the plurality of elements are arranged along the set of teeth; and
engaging at least one pair of the elements such that at least one part of one of the elements in the pair bears against at least one part of the other of the elements in the pair.

20. A method of preparing the apparatus according to claim 1, the method comprising:
providing a model of a set of teeth of a patient in a desired target configuration;
configuring at least one part of the apparatus or pair of elements based on the model; and
arranging the plurality of elements along the set of teeth, attaching the apparatus or the pair of elements to the set of teeth of the patient.

21. The apparatus according to claim 1, wherein one or more of the elements are blocks.

22. An apparatus for aligning or positioning teeth, the apparatus configured to be worn in a mouth of a wearer and further configured to be supported on the teeth of the wearer, the apparatus comprising:
a plurality of elements, some of the elements being individually attachable to different teeth in a set of the teeth; and
at least one flexible elongate member for engaging the elements for moving one or more of the teeth, the flexible elongate member connecting and threading the elements together and being configured to be tensioned to apply a component of force to the elements to engage the elements for moving the one or more of the teeth;
wherein at least one pair of the elements in the plurality is arranged to be engaged by the flexible elongate member such that at least one part of one of the elements in the pair bears against at least one part of the other of the elements in the pair, thereby moving the one or more of the teeth;
wherein the part of the one element in the pair comprises a socket or hollow portion for receiving the part of the other element in the pair in a male-female relationship, wherein the socket or hollow portion has at least one surface for guiding the part of the other element in the pair into the socket.

23. The apparatus according to claim 22, wherein the flexible elongate member comprises at least one flexible thread which connects the elements together, the flexible thread being configured to be tensioned to apply the component of force to the elements to engage the elements for moving the one or more of the teeth.

24. The apparatus according to claim 22, wherein both of said parts of the elements in the pair comprise at least one surface, wherein the at least one surface of the one element in the pair is arranged to slidably contact and complement the at least one surface of the other element in the pair.

25. The apparatus according to claim 22, wherein the parts of the elements in the pair are movable in contact with one another, one relative to the other, for urging the one element in the pair outwardly or inwardly relative to the other element in the pair in response to the movement of the parts.

26. The apparatus according to claim 22, wherein either one or both of said parts of the elements in the pair comprises at least one surface that is at least partially curved.

27. The apparatus according to claim 26, wherein the surface that is at least partially curved has an arc, and the surface of the one element is in contact with the surface of the other element in the pair and is movable one relative to the other along the arc.

* * * * *